United States Patent
Daniel et al.

(10) Patent No.: US 6,996,467 B2
(45) Date of Patent: Feb. 7, 2006

(54) SYSTEM AND PROCESS FOR DETECTION OF WEAK OR NON-FUNCTIONING CYLINDERS IN ENGINES

(75) Inventors: Cecil Daniel, Erie, PA (US); Laurence Richard Handler, Glenn Allen, VA (US); Robert Douglas Cryer, Erie, PA (US); Dario Patricio Escobar, Erie, PA (US); James Kostrubanic, Erie, PA (US); Rocco Volpe, Jr., Keavy, KY (US); Ajith Kuttannair Kuma, Erie, PA (US); Vince Dunsworth, Edinboro, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/098,335

(22) Filed: Apr. 4, 2005

(65) Prior Publication Data

US 2005/0222749 A1    Oct. 6, 2005

Related U.S. Application Data

(63) Continuation of application No. 10/390,246, filed on Mar. 17, 2003, now Pat. No. 6,889,133, which is a continuation-in-part of application No. 10/086,350, filed on Feb. 28, 2002, now Pat. No. 6,535,810, which is a continuation of application No. 09/608,737, filed on Jun. 30, 2000, now Pat. No. 6,826,560.

(60) Provisional application No. 60/183,214, filed on Feb. 17, 2000, provisional application No. 60/380,029, filed on May 2, 2002.

(51) Int. Cl.
*G01M 15/00*    (2006.01)
*F02M 65/00*    (2006.01)

(52) U.S. Cl. .................................. 701/114; 73/116

(58) Field of Classification Search ................ 701/102, 701/114, 33, 123; 73/112, 116, 117.3, 113, 73/119 A
See application file for complete search history.

(56) References Cited

U.S. PATENT DOCUMENTS

| | | | |
|---|---|---|---|
| 5,819,714 A | 10/1998 | Bush et al. | 123/673 |
| 5,868,116 A | 2/1999 | Betts et al. | 123/481 |
| 5,884,603 A | 3/1999 | Matsuki | 123/333 |

(Continued)

OTHER PUBLICATIONS

Office Action dated May 17, 2004 for U.S. Appl. No. 10/390,246.

(Continued)

*Primary Examiner*—Hieu T. Vo
(74) *Attorney, Agent, or Firm*—Cantor Colburn LLP

(57) ABSTRACT

A system for detecting conditions indicative of substandard performance of cylinders in an internal combustion engine includes an engine control unit disposed in operable communication with the engine and a computer disposed in informational communication with the engine control unit. A method for utilizing the system includes comparing fuel requirements of the engine operating under power of all cylinders and under the successive arrest of each of the cylinders or sets of cylinders. The process is repeated until each cylinder or set of cylinders is arrested and all of the data can be compiled and considered to determine the performance of each cylinder or set of cylinders. The system measures the required fuel with all cylinders operating and enables a recommendation to be made with respect to corrective or maintenance measures that should be undertaken with respect to the isolation of the individual cylinder (s) which may be determined to be weak or non-functioning.

28 Claims, 8 Drawing Sheets

U.S. PATENT DOCUMENTS

| | | | |
|---|---|---|---|
| 6,002,980 A | 12/1999 | Taylor et al. | 701/110 |
| 6,055,468 A | 4/2000 | Kaman et al. | 701/29 |
| 6,082,187 A | 7/2000 | Schricker et al. | 73/116 |
| 6,199,007 B1 | 3/2001 | Zavarehi et al. | 701/111 |
| 6,216,668 B1 | 4/2001 | Haugen | 123/320 |
| 6,535,810 B2 | 3/2003 | Volpe, Jr. et al. | 701/114 |
| 6,889,133 B2 * | 5/2005 | Daniel et al. | 701/114 |
| 2003/0196633 A1 | 10/2003 | Gottemoller et al. | 123/198 |

OTHER PUBLICATIONS

Office Action dated May 6, 2003 for U.S. Appl. No. 09/788,737.

Office Action dated Sep. 30, 2002 for U.S. Appl. No. 10/086,350.

Office Action dated Sep. 27, 2002 for U.S. Appl. No. 09/788,737.

* cited by examiner

SYSTEM AND PROCESS FOR DETECTION OF WEAK OR NON-FUNCTIONING CYLINDERS IN ENGINES

CROSS-REFERENCE TO RELATED APPLICATIONS

This application is a continuation of U.S. patent application Ser. No. 10/390,246, filed on Mar. 17, 2003, issued on May 3, 2005 as U.S. Pat. No. 6,889,133 B2, which is a continuation-in-part of U.S. patent application Ser. No. 10/086,350, filed on Feb. 28, 2002, issued on Mar. 18, 2003 as U.S. Pat. No. 6,535,810, which is a continuation of of U.S. patent application Ser. No. 09/608,737, filed on Jun. 30, 2000, now U.S. Pat. No. 6,826,560 which claims the benefit of U.S. Provisional Patent Application No. 60/183,214, filed on Feb. 17, 2000, the contents of all three applications being incorporated herein by reference in their entirety. This application also claims the benefit of U.S. Provisional Patent Application No. 60/380,029, filed on May 2, 2002, which is also incorporated herein by reference in its entirety.

BACKGROUND

This disclosure relates to diesel engines, and, more particularly, to a system and process for detecting conditions indicative of substandard performance of the cylinders, pumps, valves, and fuel injection devices within large scale multi-cylinder engines.

Spark ignition engines are internal combustion devices in which electrical discharges ignite air/fuel mixtures. One such spark ignition engine is an Otto cycle engine in which heat is converted to work in a thermodynamic cycle comprising alternating isentropic compressions and expansions of air/fuel mixtures interspersed with alternating additions and rejections of heat at constant volume. Compression ignition engines, on the other hand, are internal combustion devices in which high compression ratios produce the ignition of air/fuel mixtures. One such compression ignition engine operates under a diesel cycle, in which the air/fuel mixture is ignited under a compressive force. In a diesel cycle engine, heat is converted to work via alternating isentropic compressions and expansions of air/fuel mixtures interspersed with alternating heat additions at constant pressure and heat rejections at constant volume. The conventional ignition processes of spark ignition engines are inapplicable with respect to diesel engines.

For either type of engine, control of the engine is attained primarily through the influence of a fuel injection or delivery process and the amount of fuel injected. Differences in tolerances of the components of an engine oftentimes result in variation in the behavior of each of the individual cylinders of the engine. This variation causes less than optimum performance to be realized by the engine. Such performance is characterized by low power output as a result of weak or non-functional cylinders, fuel pumps, and/or fuel injection devices. Operation of the engine on a weak or non-functional cylinder generally results in increased fuel consumption, emission of harmful substances, vibration, excessive noise, and shortened service life.

While increased fuel consumption, emission of harmful substances, vibration, excessive noise, and shortened service life are generally indicative of a weak cylinder condition, such indicators require lengthy periods of monitoring of a large number of attributes of the engine. Direct methods of the detection of weak and non-functioning cylinders have been performed by highly skilled artisans using solely their experience-trained senses. In these methods, an operator of an engine brings the engine up to a load and a speed and allows the engine to reach a steady state condition. The operator then monitors the fuel volume flowing from one of the fuel pumps or injectors to one of the cylinders. For each cylinder, the skilled operator listens to the sound emanating from the cylinder and makes a determination regarding the response of the cylinder to the changed volume of fuel being supplied. Given even a narrow range of environmental and other conditions, such a determination is generally highly subjective and open to various interpretations even by the same operator. Some interpretations may result in the removal of trouble-free cylinders, pumps, or injectors, particularly if communication across the cylinder, pump, or injector is intermittent for any reason (e.g., the cylinder, pump, or injector experiences an "open stator" condition). In such a case, the lack of electrical communication may cause normally functioning cylinders, pumps, or injectors to misfire, thereby giving false test results and leading to unnecessary removal of such devices. Based on the determination itself, the operator makes a judgment as to the condition of the components of each cylinder and thereby recommends remedial or other action.

While such methods have been effective for many years, they are not the most economical, effective, or accurate means of determining the condition of the cylinder structures of internal combustion engines. Furthermore, they are certainly not the most time-efficient methods or a means that can be carried out with the frequency required by the operation of large scale equipment into which an engine is incorporated.

BRIEF DESCRIPTION OF THE INVENTION

The above discussed and other drawbacks and deficiencies are overcome or alleviated by a method of analyzing the operation of a fuel injected, multi-cylinder internal combustion engine having independent control of fuel delivery for each cylinder, so as to identify cylinders delivering substandard performance, the method including operating the engine to attain steady-state, operating the engine in an analysis mode at a substantially constant operational condition, gathering data indicative of fuel usage of the engine cylinders when the engine is operating on all cylinders in the analysis mode, gathering data indicative of the fuel usage of the engine cylinders when the engine is operating with the operation of at least one cylinder arrested in the analysis mode until data gathering has been performed with all cylinders having been arrested, and analyzing the gathered data to identify the engine operations for which fuel usage was affected to a lesser degree by the arrest of cylinder operation to identify cylinders delivering substandard performance.

In another embodiment, a method of analyzing the operation of a fuel injected, multi-cylinder internal combustion engine having independent control of fuel delivery for each cylinder, so as to identify cylinders delivering substandard performance, includes operating the engine in an analysis mode at a substantially constant operational condition, gathering data indicative of fuel usage of the engine cylinders when the engine is operating on all cylinders in the analysis mode, gathering data indicative of the fuel usage of the engine cylinders when the engine is operating with the operation of at least one cylinder arrested in the analysis mode until data gathering has been performed with all cylinders having been arrested wherein the data gathered is representative of fuel usage of all operating cylinders for a series of cylinder firings of a selected number, and analyzing the gathered data to identify the engine operations for which fuel usage was affected to a lesser degree by the arrest of cylinder operation to identify cylinders delivering substandard performance.

In another embodiment, a method of analyzing the operation of a fuel injected, multi-cylinder internal combustion engine having independent control of fuel delivery for each cylinder, so as to identify cylinders delivering substandard performance, includes operating the engine in an analysis mode at a substantially constant operational condition wherein the engine includes a fuel injection system for each cylinder and wherein the duration of time during which each system delivers fuel is measured, with the duration of time being indicative of fuel usage at the respective cylinder, gathering data indicative of fuel usage of the engine cylinders when the engine is operating on all cylinders in the analysis mode, gathering data indicative of the fuel usage of the engine cylinders when the engine is operating with the operation of at least one cylinder arrested in the analysis mode until data gathering has been performed with all cylinders having been arrested; and analyzing the gathered data to identify the engine operations for which fuel usage was affected to a lesser degree by the arrest of cylinder operation to identify cylinders delivering substandard performance.

In another embodiment, a method for analyzing the performance of sets of cylinders of a fuel injected multi-cylinder internal combustion engine having independent control of fuel delivery for each cylinder includes maintaining the engine at a substantially constant operational condition, arresting a first set of cylinders of the engine for a period of time while remaining cylinders operate, simultaneously flowing fuel to the first set of cylinders while arresting a second set of cylinders, and continuing to simultaneously flow fuel to an already arrested set of cylinders while arresting a next set of cylinders until all sets of cylinders have been arrested and restored, calculating an average fuel volume required by operating cylinders during the period of time when a set of cylinders is arrested, and comparing the average fuel volume with an average fuel volume of each of the other sets of cylinders.

In another embodiment, a system for detecting conditions indicative of substandard performance of an engine cylinder of a fuel injected, multi-cylinder internal combustion engine while the engine is operating at steady state and at a predetermined operational condition, includes an engine control unit disposed in operable communication with the engine to independently control the fuel delivery for each cylinder, while the engine is operating, a first computer disposed in informational communication with the engine control unit, the computer having the ability to communicate with the engine control unit while the engine is in operation, wherein the informational communication with the engine control unit includes a dynamic signal controlling which cylinders receive fuel so that the engine operates with all cylinders operating or with selective cylinders arrested, the dynamic signal transmitted from the computer and received by the engine control unit, and a second computer disposed in informational communication with the engine control unit, the second computer being able to communicate with the engine control unit while the engine is in operation, the second computer receiving a feedback signal providing a quantitative determination of an amount of fuel dispensed to the engine in maintaining substantially constant operational condition until data gathering has been performed with all cylinders having been arrested, the feedback signal transmitted from the engine control unit and received by the second computer for analyzing the data so as to identify the cylinders generating substandard performance.

In another embodiment, a method for assessing the performance of cylinders of a fuel injected, multi-cylinder internal combustion engine having independent control of fuel delivery for each cylinder, includes maintaining the engine at a substantially constant operational condition, analyzing each of the cylinders of the engine with an algorithm which compares fuel value readings taken at a baseline condition and at an arresting of each of the cylinders, determining an operability of each of the cylinders, and archiving the resultant operability determination for later access and comparison against later fuel value readings.

In another embodiment, a method for detecting a weak or non-functioning cylinder in a fuel injected, multi-cylinder internal combustion engine having independent control of fuel delivery for each cylinder, includes operating the engine at a substantially constant operational condition, establishing a baseline condition for a first steady state operating condition, establishing a second steady state operating condition, wherein at least one cylinder has been arrested, testing individual cylinders of said engine sequentially, reestablishing the base line condition, and determining a functionality of each of the individual cylinders by analyzing a fuel value requirement for each of the cylinders at a point at which each cylinder is arrested and comparing the fuel value requirement, of any arrested cylinder, with a fuel value requirement for the second steady state operating condition.

In another embodiment, a method of analyzing the operation of a fuel injected, multi-cylinder internal combustion engine having independent control of fuel delivery for each cylinder, so as to identify cylinders delivering substandard performance, includes (a) gathering a first set of data indicative of fuel usage of the cylinders when the engine is operating on all cylinders, (b) gathering a second set of data indicative of fuel usage of the cylinders when the engine is operating on all cylinders, (c) comparing the first set of data to the second set of data, and, if not equivalent, obtaining a third set of data, comparing the third set of data to the second set of data, and so on until an n+1 set of data is equivalent to an n set of data, (d) gathering and comparing first and second sets of data indicative of fuel usage of the cylinders when the engine is operating with the operation of at least one cylinder arrested, and, if not equivalent, gathering a third set of data indicative of fuel usage of the cylinders when the engine is operating with the operation of at least one cylinder arrested and comparing to the second set of data indicative of fuel usage of the cylinders when the engine is operating with the operation of at least one cylinder arrested, and so on until an n+1 set of data is equivalent to an n set of data, (e) repeating step (d) until all cylinders have been arrested, and (f) analyzing the gathered data to identify any arrest configurations for which fuel usage was affected to a lesser degree to identify cylinders delivering substandard performance.

In another embodiment, a method of analyzing the operation of a fuel injected, multi-cylinder internal combustion engine having independent control of fuel delivery for each cylinder, so as to identify cylinders delivering substandard performance, includes (a) arresting cylinder z from a time $t_x$ to a time $t_{x+1}$, (b) gathering data indicative of fuel usage of the engine cylinders when the engine is operating with the operation of cylinder z arrested, (c) calculating a first fuel volume difference by subtracting a fuel volume reading at time $t_x$ from a fuel volume reading at time $t_{x+1}$, (d) rendering the cylinder z operational from time $t_{x+1}$ to time $t_{x+2}$, (e) calculating a second fuel volume difference by subtracting a fuel volume reading at time $t_{x+2}$ from the fuel volume reading at time $t_{x+1}$, (f) if the first volume difference is not substantially equal to the second volume difference, then repeating steps (a) through (e), (g) when the first volume difference is substantially equal to the second volume difference, then cylinder z=cylinder z+1, and x=x+1, (h) repeating steps (a) through (g) until data gathering has been performed with all cylinders having been arrested, and (i) analyzing gathered data to identify engine operations for which fuel usage was affected to a lesser degree by the arrest of cylinder operation to identify cylinders delivering substandard performance.

The above discussed and other features and advantages of the present invention will be appreciated and understood by those skilled in the art from the following detailed description and drawings.

DETAILED DESCRIPTION

Figure 1:
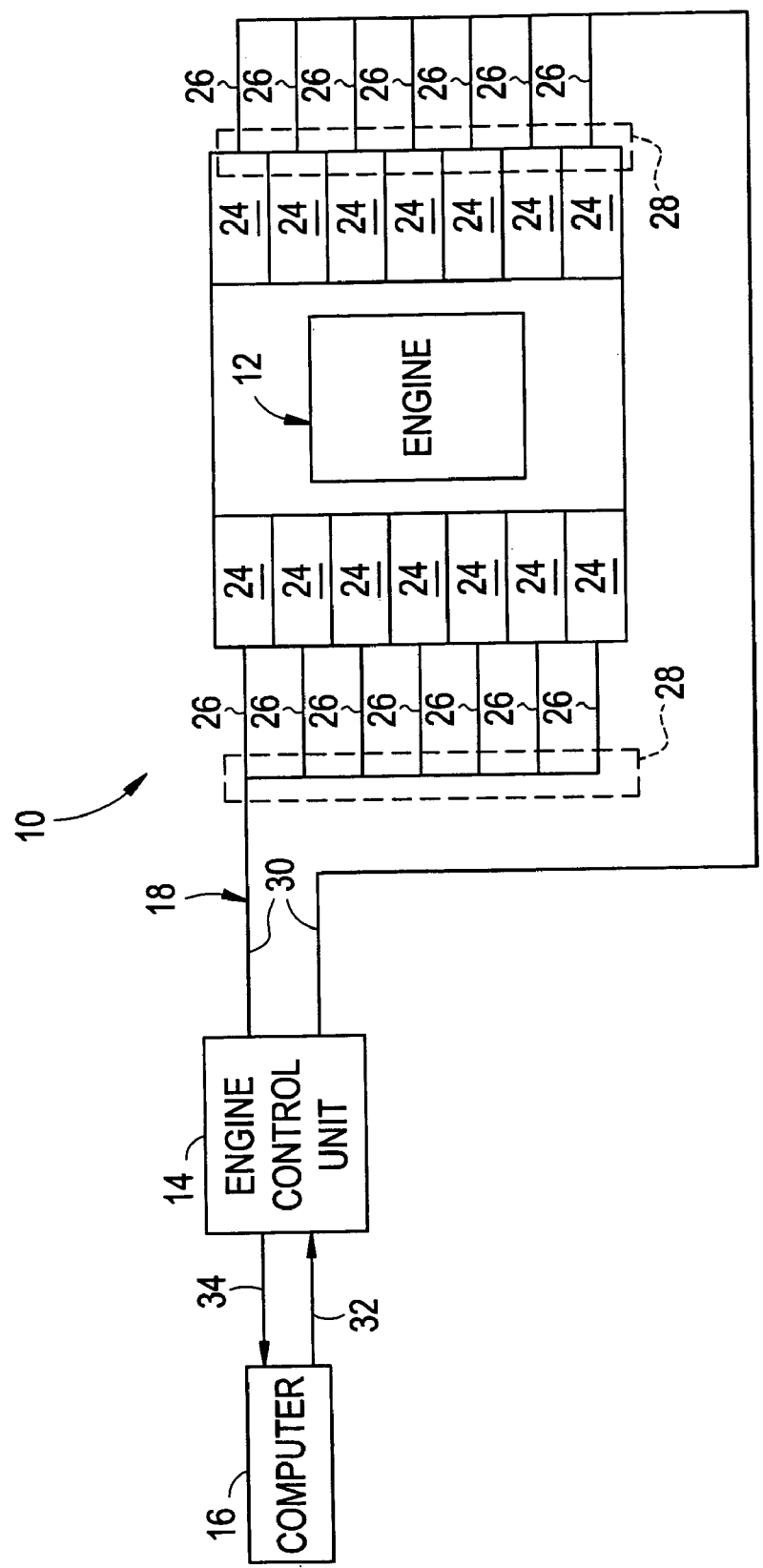
FIG. 1 is a schematic illustration of the system for the detection of conditions indicative of substandard performance of cylinders in an engine.

Referring to FIG. 1, a system for the detection of conditions indicative of substandard performance of the various components of an internal combustion engine is shown generally at 10 and is hereinafter referred to as "system 10." Although the disclosure below is described in relation to the cylinders of an internal combustion engine, the disclosure encompasses other components of the engine including, but not limited to, pumps, valves, and fuel injection devices. System 10 is a diagnostic tool capable of measuring the required fuel, or determining the statistical fuel requirement, per cylinder for an engine having some or all of its cylinders operational. System 10 is, furthermore, capable of temporarily arresting the operation of each individual operational cylinder in succession while operating in an analysis mode (i.e., while maintaining a select constant speed and load of the engine) and re-measuring the fuel requirement per cylinder of the engine with all but one cylinder (or all but a group of cylinders) functioning. System 10 may be employed in conjunction with a vehicle, such as a locomotive or within a marine application including on board ships and the like, or may be used in conjunction with stationary pieces of equipment such as stationary power generators. The conditions detectable by system 10 are generally those indicative of weakened cylinder system, although other conditions (e.g., non-functional cylinders) may be detectable. Any cylinder structure may be considered to deliver substandard performance if conditions fall anywhere in the range of dead (non-functioning) to less than 100% standard performance. Based on the detected conditions, diagnostic recommendations pertaining to the operation of the engine can thereby be made.

System 10 comprises an engine, shown generally at 12, an engine control unit 14 in informational communication with engine 12, and a computer 16 in informational communication with engine control unit 14. Informational communication between engine 12 and engine control unit 14 is maintained through a wiring harness, shown generally at 18. Computer 16 is installed on board a motor vehicle (not shown) or stationary power generator into which engine 12 is incorporated and is integrally configured with other control elements of engine 12. If used in a vehicle, the motor vehicle may be a railway locomotive or marine vehicle. Alternately, a portable computer (not shown) having the requisite software can be used to provide an interface between the operator and system 10.

Engine 12 comprises a plurality of cylinders 24. Typically, engine 12 comprises eight, twelve, or sixteen cylinders, although it should be understood by one of ordinary skill in the art that any number of cylinders may be assembled to form engine 12. Each cylinder 24 includes a fuel injection/delivery (i.e., a non-carbureted) system (not shown) that provides the fuel required for combustion to its respective cylinder 24.

Wiring harness 18 comprises a plurality of connections 26 between each individual cylinder 24 and engine control unit 14. Each connection 26 includes a valve (not shown) disposed therein to provide control of the fuel flow to each individual cylinder 24. It should be understood by one of ordinary skill in the art that each connection 26 may be in direct communication with engine control unit 14. Each individual connection terminates in a single node 28, which is in turn maintained in communication with engine control unit 14 through a single communication element 30. As shown, wiring harness 18 includes two nodes 28, each of which are maintained in communication with engine control unit 14 through communication elements 30. It should also be noted that communication between the engine control unit 14 and each connection 26 is still possible such that activity of each individual cylinder 24 may be monitored and/or controlled individually or in sets as desired.

Computer 16 is communicatively connected to engine control unit 14 such that informational control can be maintained over the operation of engine control unit 14. The communicative connection between computer 16 and engine control unit 14 is characterized by a dynamic signal 32 and a feedback signal or signals 34. Control through such signals 32, 34 provides for the monitoring of various parameters associated with the operation of engine 12. In particular, feedback signal 34, through the communication element 30, enables computer 16, via engine control unit 14, to measure the time over which fuel is dispensed to each cylinder 24 through its respective fuel pump injection system while dynamic signal 32, through the communication element 30, enables computer 16, through the engine control unit 14, to provide control of the amount of fuel dispensed through the fuel pump injection systems. Such control is transparent to the operator. In such a manner the amount of fuel dispensed to each individual cylinder 24 can be derived, calculated, or obtained, compared to a derived value in a linearization table compiled from calibration data characteristic of the particular design of engine 12, and independently adjusted, thereby further allowing for the selective operational arrest of any cylinder 24 or combination of cylinders 24 from operation while enabling the remaining cylinders 24 of engine 12 to continue to run. Such a procedure enables information pertinent to each cylinder 24 to be received individually and interpreted collectively.

Figure 2:
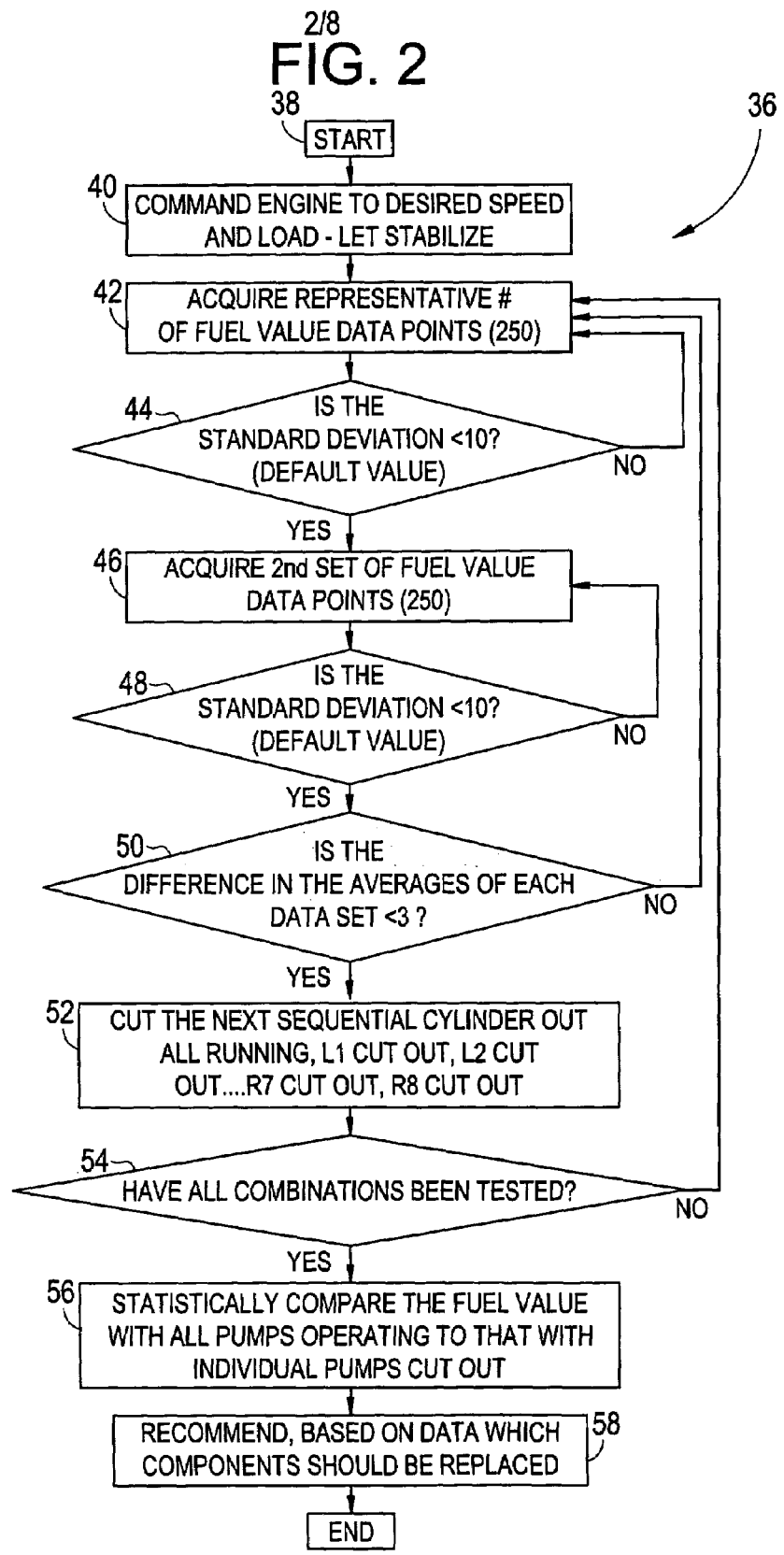
FIG. 2 is a flowchart illustrating the method of operation of the system for the detection of conditions indicative of substandard performance of cylinders in an engine.

Referring now to FIG. 2, a test sequence of events by which the computer monitors and controls the engine control unit and ultimately the engine is illustrated with a flowchart, shown generally at 36. Such monitoring and control of the engine through the test sequence of events (as stated above) is transparent to the operator of the motor vehicle. As shown in flowchart 36 the test sequence is initiated with a start command 38. Start command 38 initiates a command 40 to run the engine at a specified speed and load. The specified speed and load values are selected by control software (not shown). Execution of command 40 to run the engine effectuates the stabilization of the engine at the specified speed and load values. The stabilization generally encompasses the raising of the temperatures of engine oil and water up to steady state operating temperatures.

Upon attainment of steady state operating condition or conditions (such as speed, load, temperature, etc.), a testing sequence is initiated wherein fuel value readings for the engine as it operates under the power of all functional cylinders are obtained. Such fuel value readings correspond with fuel volumes, which are obtained from the measurement of the flow of the fuel over a time period. A first executable loop is defined by a first acquisition command 42 and a first comparison decision 44. Upon execution of first acquisition command 42 and first comparison decision 44, a first set of fuel value readings representative of the total number of fuel value readings are acquired by the computer through the engine control unit. A default value is used to define the number of readings taken for further calculations. This default value may be 250 or any other selected sample number. (250 is exemplarily selected, however the sample number is preferably dependent upon the expected period of equipment cycling to capture data in a period of time when the equipment is on.) Mean and standard deviation values of the readings are calculated. Although standard deviation is described, it should be understood that other forms of statistical calculations may be made. The standard deviation value is compared to a first selected maximum allowable value. The first selected maximum value shown in first comparison decision 44 is 10, although any positive value can be programmed into the software code that defines the loop. If the standard deviation value is greater than the first selected maximum allowable value, then control is passed from first comparison decision 44 back to first acquisition command 42 and the first set of fuel value readings is re-collected. If, on the other hand, the standard deviation value is less than the first selected maximum allowable value, then an average of the first set of fuel valve readings is taken and stored and control is passed to a second executable loop defined by a second acquisition command 46 and a second comparison decision 48. In the second executable loop, a second set of fuel value readings is acquired by the computer. If, in a manner similar to that characteristic of the first set of fuel value readings, the standard deviation of the second set of fuel value readings is greater than a second selected maximum value (which, in this example, is the same as the first selected maximum value), then the second set of fuel value readings is re-collected. However, as above, if the standard deviation value is less than the second selected maximum allowable value, then an average value of the second set of readings is taken. Again, other forms of statistical calculations would be within the scope of this system.

The average values of each set of readings are then compared in an overall comparison decision 50. If the differences between the averages is greater than a maximum selected allowable value (which is shown as being 3, although any positive value can be programmed into the software), then both sets of fuel value readings are re-collected. To re-collect the fuel value readings, control is passed back to first acquisition command 42 and another first set of fuel value readings representative of the total number of fuel value readings is acquired.

If, on the other hand, the value of overall comparison decision 50 is less than the maximum selected allowable value, then a baseline condition is established by a series of substantially constant fuel value readings. The degree of constancy is determined by the collection of readings within a range of fuel values defined by an upper fuel value limit and a lower fuel value limit. Once the baseline is established, control then passes to a testing sequence 52 that proceeds such that fuel value readings are obtained wherein each individual cylinder of the engine is arrested or "cut out" in a pre-set order by having its incoming fuel flow reduced to zero, thereby causing the engine to operate on all cylinders except the one arrested while maintaining the selected speed and load. As alluded to above, groups of cylinders or "inquiry sets" that comprise one or more cylinders may also be arrested, thereby allowing the monitoring of the engine to be abbreviated. Combinations and permutations of individual cylinders and inquiry sets are arrested to provide a representation of the overall functioning of the engine. Testing sequence 52 is continued until each individual cylinder or inquiry set of cylinders has been successively arrested and restored to operation.

Upon completion of testing sequence 52, a decision 54 is executed. If, per decision 54, all cylinders have not been arrested in the engine and data obtained therefore, control is passed back to the first executable loop and the entire procedure is reinitiated. If, however, all cylinders have been successively arrested, control is passed to an analysis function 56 and the data obtained are analyzed by the computer. In analysis function 56, an algorithm (not shown) analyzes the engine cylinder activity and calculates the cylinder performance. In particular, the amount of fuel consumed by each cylinder for the engine operating on all cylinders (the baseline condition) is statistically compared with the amounts of fuel consumed by each cylinder for the engine operating with the fuel flow to each of the various cylinders being reduced to zero. Such analysis enables the relative contribution of each cylinder to be ascertained and further used to determine the relative power output of each cylinder. Based on the data, control is passed to a recommendation function 58 wherein recommendations can be made concerning which, if any, components of the engine (particularly the cylinder components including fuel injection or delivery devices) should be replaced.

Figure 3:
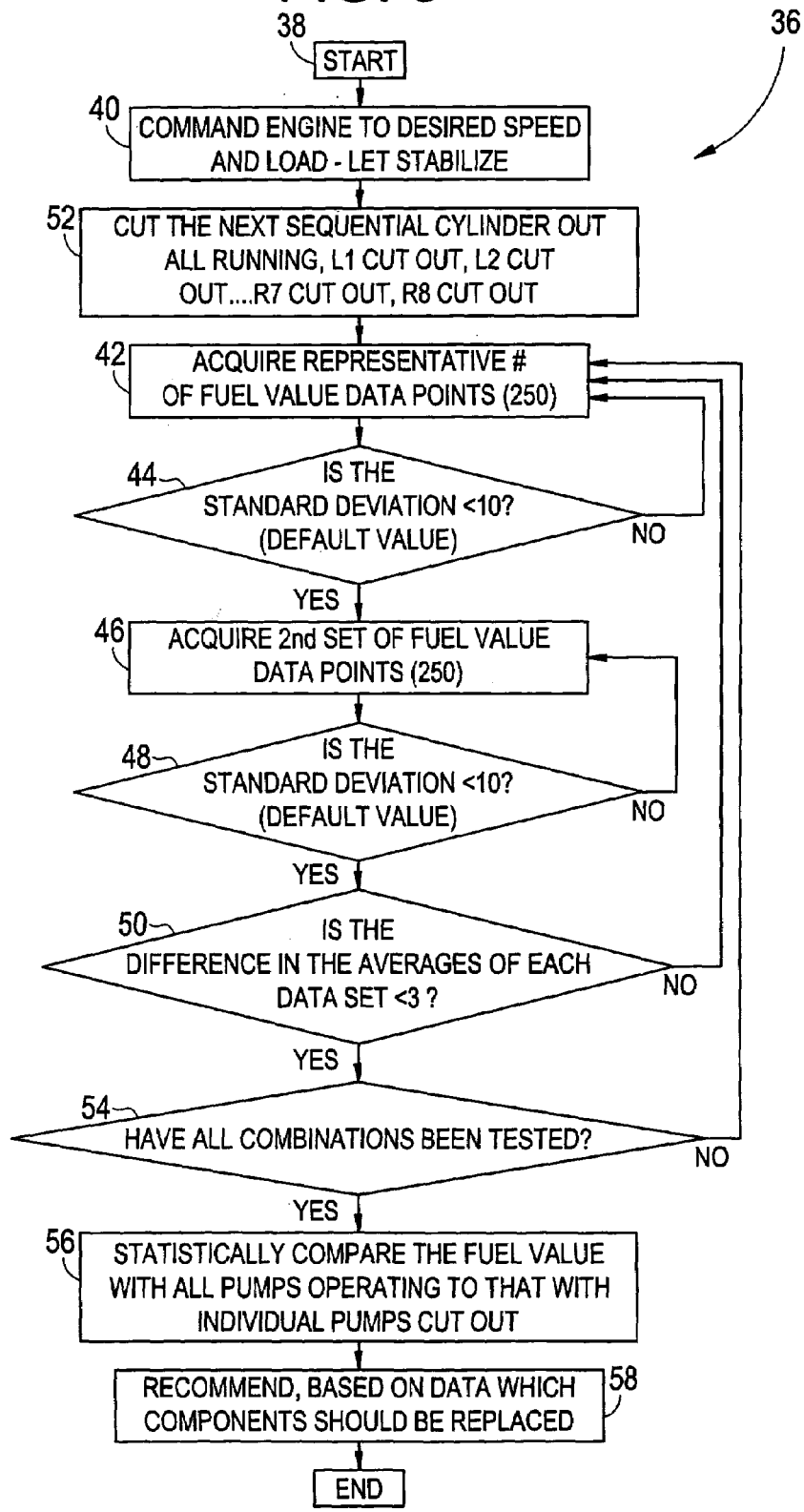
FIG. 3 is a flowchart illustrating an alternate method of operation of the system for the detection of conditions indicative of substandard performance of cylinders in an engine.

Alternately, testing sequence 52 may be performed immediately subsequent to the execution of command 40. Referring now to FIG. 3, flowchart 36 is rearranged to illustrate an alternate sequence of monitoring and controlling events. In FIG. 3 control is passed to the first and second executable loops subsequent to the temporary arrest of each cylinder or inquiry set. Data values corresponding to the arrest of the cylinders or inquiry sets are stored in a register and retrieved for analysis as needed upon completion of the second executable loop and prior to decision 54.

Execution of recommendation function 58 may be at a location remote from the operation of the engine. In particular, the data obtained from analysis function 56 may be relayed by any one of a variety of means including, but not being limited to, satellite transmission to a distally located control and command center. In the event that a defective cylinder is found, the decision for maintenance can be made at the control and command center and relayed back to the engine, where it can be carried out by the operator or specified maintenance personnel.

Regardless of whether testing sequence 52 is performed immediately subsequent to the executable loops that result in the first and second sets of fuel value readings or immediately subsequent to the overall comparison decision 50, the presence of weakened cylinder structure may be detected by the employment of a weak cylinder detection algorithm (not shown). In the weak cylinder detection algorithm, pre-set lower limits are established for the fuel values measured. A value for each cylinder tested is obtained compared to the pre-set lower limit. If the value for each cylinder exceeds the pre-set lower limit, then the relative performance of each cylinder is compared to the cylinder having the highest value. The amount of wear can then be determined by comparing the fuel value of each cylinder to the cylinder having the highest value. The comparison of values is, however, a relative number and is typically expressed as a percentage (e.g., the tested cylinder has a certain percentage of wear as compared to the "strongest" cylinder).

Figure 4:
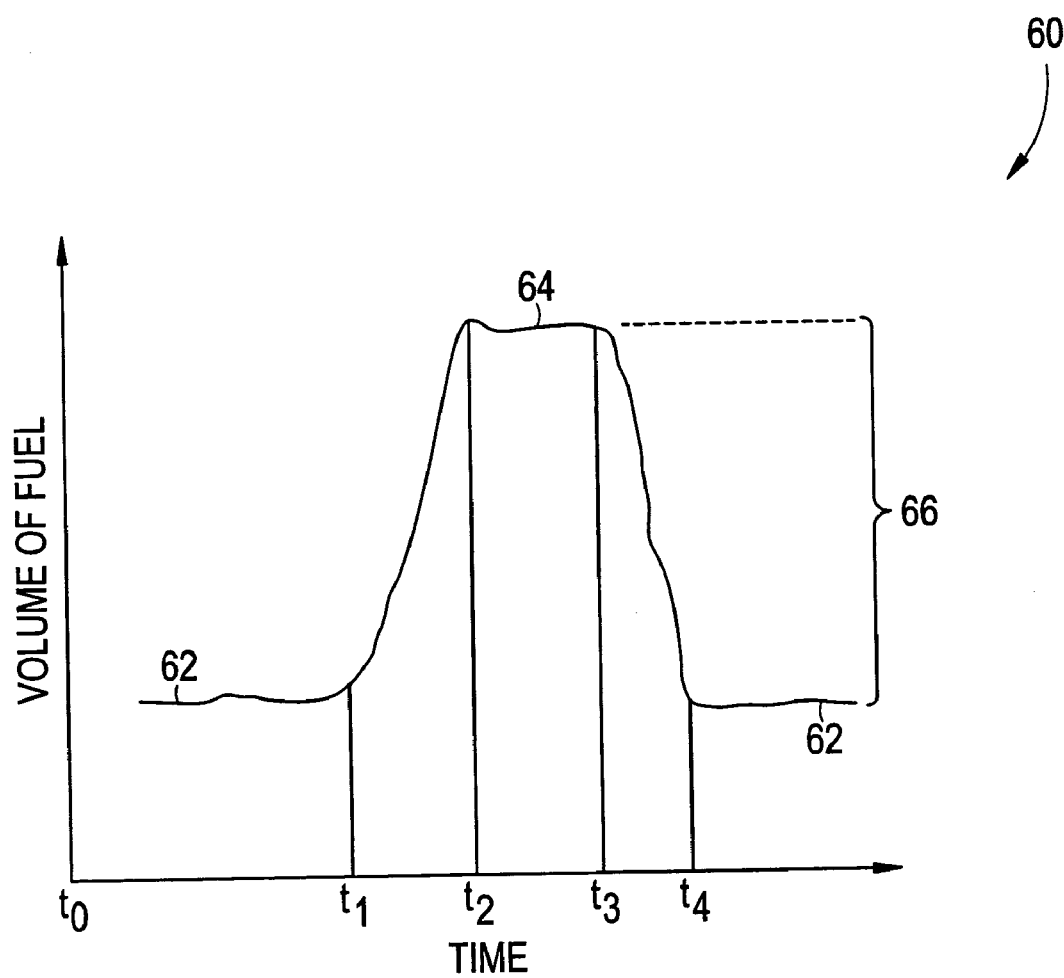
FIG. 4 is a graphical representation of a fuel requirement measurement to determine weakened conditions of a cylinder in an engine.

Referring now to FIG. 4, a graphical interpretation of a fuel value measurement of a cylinder of the engine is shown generally at 60 and is hereinafter referred to as "graph 60." In graph 60, the fuel requirement of the engine per cylinder is plotted as a function of the time over which one or more cylinders are arrested. As can be seen, the fuel requirement of the engine per cylinder at a steady state value 62 is substantially constant over a period of time ($t_0$ to $t_1$) in which all cylinders of the engine are operational (the baseline condition). When the fuel flow to one or more cylinders of the engine is restricted, thereby arresting the cylinder, the fuel requirement of the engine per cylinder increases over a period of time ($t_1$ to $t_2$) in order to compensate for the loss of output (speed and/or load) experienced as a result of the arrest of the cylinder or set of cylinders. During a period of time ($t_2$ to $t_3$) in which the cylinder or set of cylinders is completely arrested, the fuel requirement of the engine per cylinder reaches a new steady state value 64. A difference 66 between steady state value 62 and new steady state value 64 is the relative power contributed by the one cylinder or the set of cylinders. For example, in a fourteen cylinder engine, the arrest of one cylinder yields a theoretical overall increase in total fuel consumption per cylinder of 7.14%. The introduction of fuel back into the cylinder or set of cylinders over a period of time ($t_3$ to $t_4$) then causes the fuel requirement of the engine per cylinder with all cylinders operational to decrease back to its original steady state value 62. Upon reaching the original steady state value 62, a successive cylinder or set of cylinders can be arrested.

A diagnostic recommendation of each cylinder can then be made based on analysis of the actual change in the fuel requirement associated with the respective cylinder. The analysis of the diagnostic recommendation may be converted into a quantifiable value from which an objective determination of the condition of the cylinder can be made. If, for example, the actual increase in fuel requirement per cylinder of a fourteen cylinder engine upon arrest of a particular cylinder varies substantially from 7.14%, then an operator can conclude that the arrested cylinder is not contributing to the power output at its full potential and that it may be defective and may warrant maintenance or replacement. Similarly, when arresting sets of cylinders, it may be more quickly determined that an entire set of cylinders is delivering standard performance, and individual testing of the cylinders within that set is not necessary. However, if a set of cylinders is determined to deliver substandard performance, then individual cylinders from within that set can be tested as described above, or merely replaced as a set.

Figure 5:
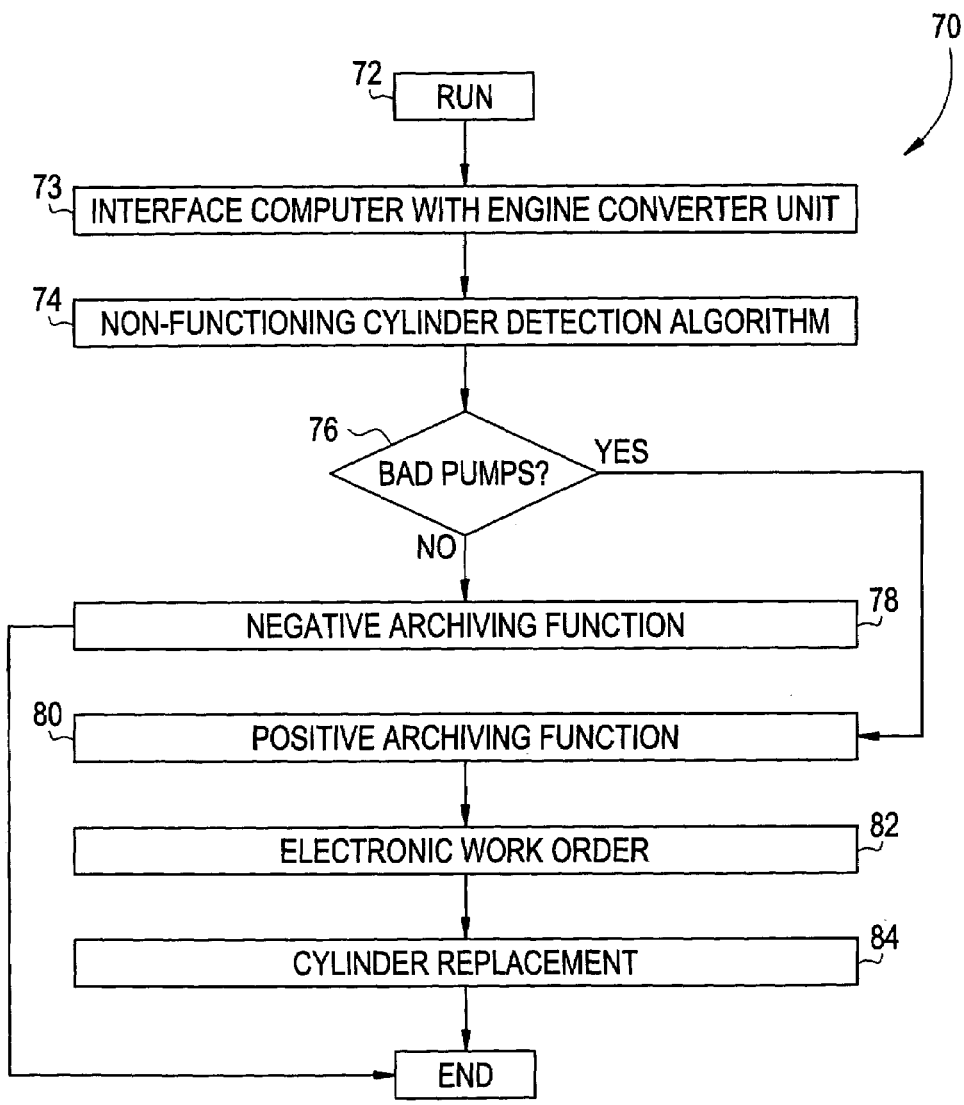
FIG. 5 is a flowchart illustrating a process by which the presence of weak or non-functioning cylinders in an engine are determined.

A flowchart illustrating a process by which an assessment of an engine is made to determine the presence of non-functioning ("dead") cylinders is shown with reference to FIG. 5 and is hereinafter referred to as "process 70." As stated above, the assessment of the engine may be made to determine non-functioning pumps, valves, fuel injection devices, and the like. Process 70 comprises a non-functioning cylinder detection algorithm to assess each cylinder on a pass/fail basis. Process 70 is initiated by an engine run command 72, at which the engine is brought to steady state operating levels. An operator then interfaces the engine control unit with the computer at an interface step 73 to enable communication to be maintained between the engine and the operator. Control is then passed to the non-functioning cylinder detection algorithm 74, at which time software associated with the algorithm is initialized and cylinder analysis begins. Subsequent to the sequential analysis of all cylinders, a decision 76 is made to determine the presence of any non-functioning cylinders, pumps, or injectors. If decision 76 is negative, then control passes to a negative archiving function 78, at which data indicative of an engine in which all cylinders are fully operational is uploaded into a database or stored locally. If, on the other hand, decision 76 is positive (cylinders are determined to be non-functional), then control passes to a positive archiving function 80, at which data indicative of an engine in which specified cylinders are defective is uploaded into the database or stored locally. From the archiving of positive data, an electronic work order 82 is created. Electronic work order 82 flags the non-functioning cylinder(s) detected for subsequent replacement 84. Process 70 then ends until it is reinitiated.

The actual analysis of each individual cylinder to determine its operability is effected by the employment of the non-functioning cylinder detection algorithm. Referring back to FIG. 2, the non-functioning cylinder detection algorithm may be effected through the same test sequences illustrated as flowchart 36. The test sequence used to determine the presence of non-functioning cylinders, however, establishes a baseline condition each time the test is executed and makes a comparison of data collected at the conclusion of the testing sequence, thereby precluding the determination of the presence of non-functioning cylinders prior to the collection of the all of the data pertaining to the cylinders of the engine.

As described above, the test sequence to determine the presence of a non-functional cylinder is initiated with start command 38, which in turn initiates command 40 to run and stabilize the engine at a specified speed and load. Upon the attainment of the steady state condition at the specified speed and load, the testing sequence is initiated wherein the first and second loops are executed and the data is collected and compared to establish the baseline condition. Control is then passed to testing sequence 52 in which each individual cylinder of the engine is arrested.

As testing sequence 52 is executed and each cylinder is sequentially arrested, the fuel requirement of the engine is increased in order to maintain the engine at the steady state specified speed and load. Preferably, only one cylinder is arrested at a time, however, it is also possible to arrest a set of cylinders at one time. Furthermore, each cylinder or set of cylinders is preferably arrested such that the engine is not allowed to revert to the baseline condition (e.g., as fuel is made to flow to an arrested cylinder or set of cylinders to restart the cylinder or set of cylinders, the next cylinder or set of cylinders is simultaneously arrested). Such a procedure avoids wide fluctuations in the amount of fuel dispensed to the engine over the test period. Once all cylinders or sets of cylinders have been sequentially arrested and fuel is fed to each cylinder, the baseline condition is reestablished.

Figure 6:
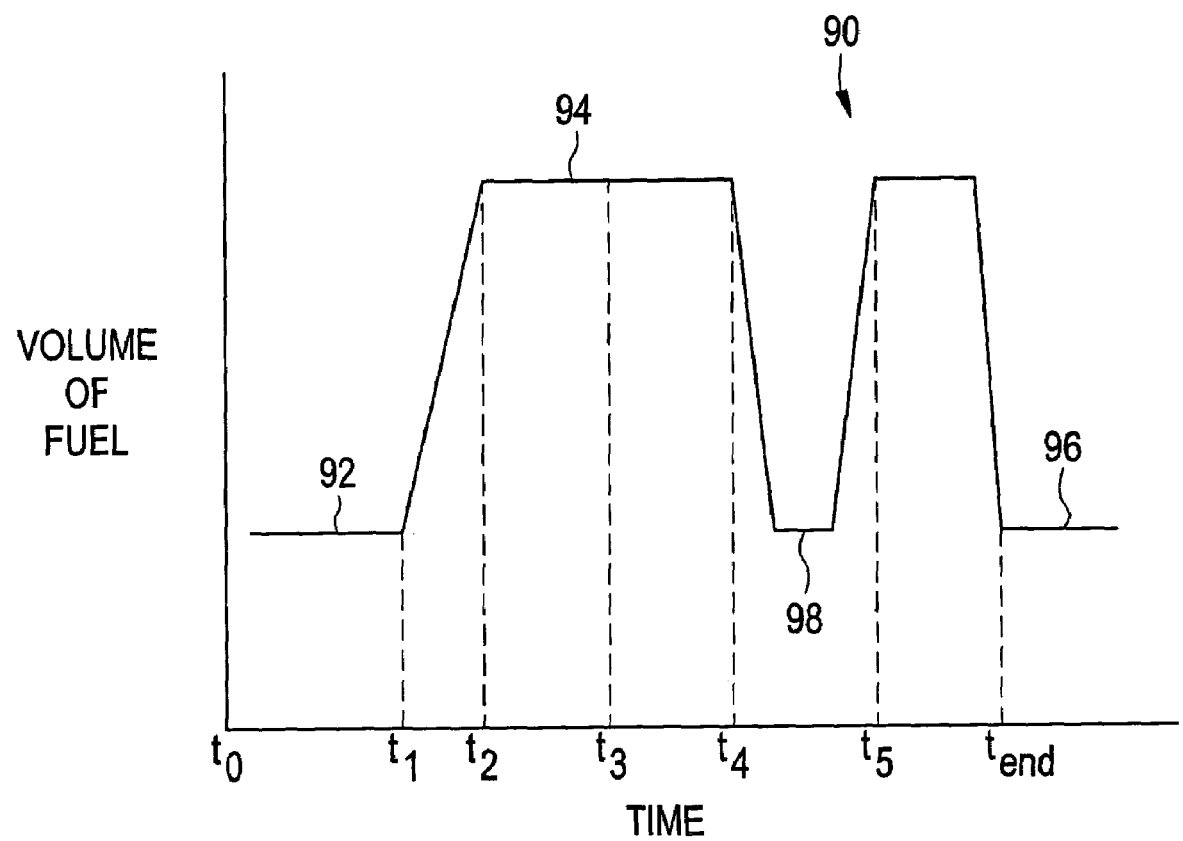
FIG. 6 is a graphical representation of a fuel requirement measurement to determine weak or non-functional cylinders in an engine.

Analysis of the test run to determine if a cylinder is functional comprises analyzing the fuel value requirements at each point at which each cylinder was arrested. Referring now to FIG. 6, a graphical interpretation of a fuel requirement measurement to determine the presence of non-functioning cylinders is shown at 90 and is hereinafter referred to as "graph 90." Graph 90 depicts one exemplary scenario in which the first, second, and last cylinders are functional, and the third cylinder is substandard, that is, weak or non-functional. This scenario also uses the single cylinder arrest approach at testing, although it should be noted that a similar scenario could be approached using sets of cylinders. It should also be noted that any number of cylinders in an engine may be weak or non-functional. In such an instance, graph 90 will be altered accordingly.

In graph 90, the fuel requirement of the engine per cylinder is plotted as a function of the time over which each cylinder is successively arrested As can be seen, the fuel requirement of the engine per cylinder at a steady state value 92 is substantially constant over a period of time ($t_0$ to $t_1$) in which all of the operational cylinders are running. The corresponding steady state value 92 defines the baseline by which the functionality of each individual cylinder is determined. The fuel requirement of the engine per cylinder increases over a period of time ($t_1$ to $t_2$) (assuming the first cylinder arrested is functional). During a period of time ($t_2$ to $t_3$) in which the first cylinder is completely arrested, the fuel requirement of the engine reaches a new steady state value 94. At time $t_3$, the first cylinder is rendered operational again and the second cylinder is simultaneously arrested. Such procedure is continued until all of the cylinders have been arrested and a steady state value 96 that approximates the baseline is restored at $t_{end}$. Any weak or non-functioning cylinder is indicated by a decrease in the fuel requirement (e.g., as indicated from time $t_4$ to time $t_5$) such that the fuel requirement dips to a value 98 that approximates the baseline value (when the cylinder is non-functional). If the cylinder is weak, yet still possesses some functionality, the fuel requirement would not dip as low as the value indicated by value 98, but would be lower than the steady state value 94. Although graph 90 illustrates the first, second, and last cylinders of the engine as being functional and the third cylinder as being non-functional, it should be understood that graph 90 is exemplary in nature and any number of cylinders (or pumps, valves, or injection devices) may be tested to produce any combination of results.

Figure 7:
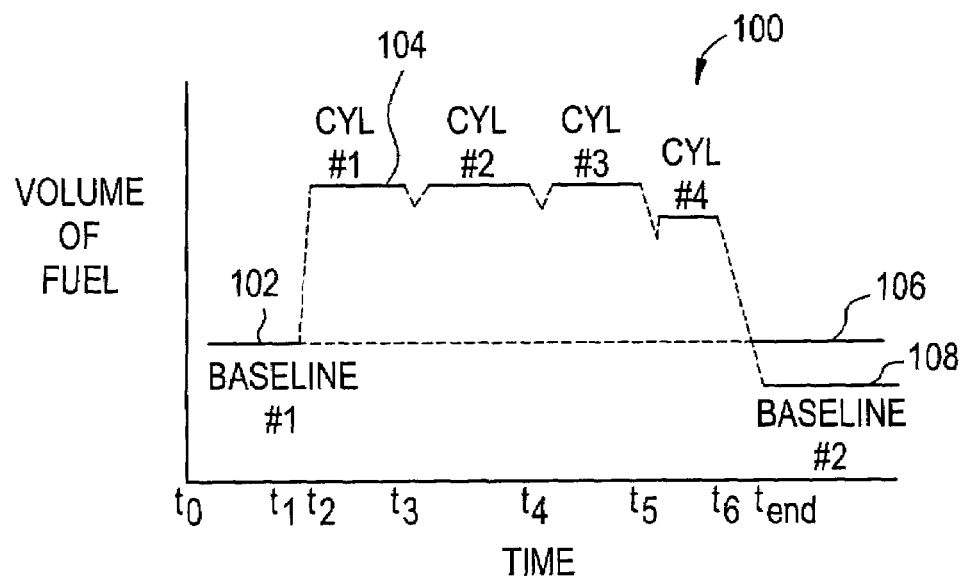
FIG. 7 is another graphical representation of a fuel requirement measurement to determine weak or non-functional cylinders in an engine.

The above-described examples assume that steady state operating conditions exist for the duration of the test cycle. Turning now to FIG. 7, graph 100 is depicted to exemplify a graphical interpretation of a fuel value measurement of cylinders of an engine, where the fuel requirement of the engine per cylinder is plotted as a function of the time over which one or more cylinders are arrested. As can be seen, the fuel requirement of the engine per cylinder at a steady state value 102 (baseline 1) is substantially constant over a period of time (t0 to t1) in which all cylinders of the engine are operational. When the fuel flow to cylinder 1, for example, is restricted, thereby arresting the cylinder, the fuel requirement of the engine per cylinder increases over a period of time (t1 to t2) in order to compensate for the loss of output experienced as a result of the arrest of cylinder 1. During a period of time (t2 to t3) in which the first cylinder is completely arrested, the fuel requirement of the engine reaches a new steady state value 104. At time t3, the first cylinder is rendered operational again and the second cylinder is simultaneously arrested. Within FIG. 7, breaks between the cylinder arrests are shown, for demonstration only, as a representation of the beginning and end of each individual cylinder test. Such procedure is continued until all of the cylinders have been arrested and a steady state value 106 that approximates the steady state value 102 is restored at tend. Any weak or non-functioning cylinder is indicated by a decrease in the fuel requirement (as indicated for cylinder 4, where cylinder 4 was arrested from time t5 to t6). The graph 100 thus indicates that cylinders 1, 2, and 3 are functional while cylinder 4 is weak.

Further in graph 100, if steady state operating conditions were not present during at least a portion of the testing cycle, the steady state value 108 arrived at tend may not approximate the initial steady state value 102. This steady state value 108 is shown to have a lower fuel requirement than the steady state value 106, however it is also possible that the steady state value 108 could have a higher fuel requirement than the steady state value 106. In either case, it is apparent that steady state operating conditions did not exist during the testing cycle if steady state value 108 is not substantially the same as steady state value 102. This condition may occur as a result of a "macro transient", that is, an element or elements outside of the tested cylinder system which may affect the outcome of the testing cycle by being turned on or off during the testing cycle. Such macro transients may include, but are not limited to, an auxiliary power source, a cooling fan, air compressor, equipment motor, etc. Thus, if it is determined that the steady state value 108 is not consistent with the steady state value 102, then it will be necessary to restart the testing cycle. It may not be automatically assumed that cylinders 1, 2, and 3 are functional and that cylinder 4 is weak because a macro transient may have affected the outcome of their samples.

Figure 8:
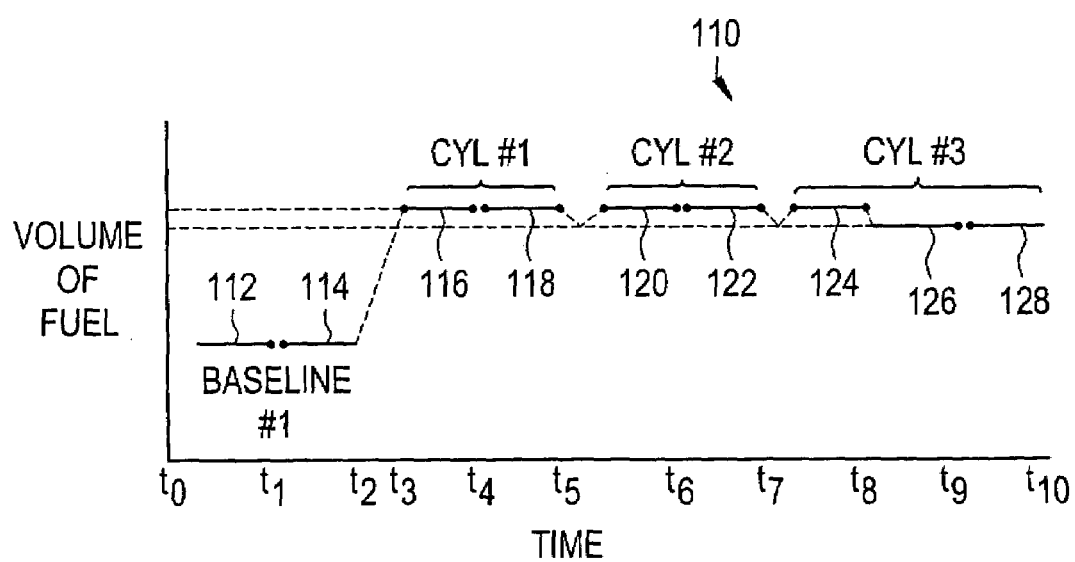
FIG. 8 is another graphical representation of a fuel requirement measurement to determine weak or non-functional cylinders in an engine.

FIG. 8 shows one example of a method for overcoming the necessity of repeating an entire testing cycle, as would be necessary if, at the end of the testing cycle shown in FIG. 7, it was found that steady state value 108 did not approximate steady state value 102. Graph 110 depicts a method of taking two sets of samples for each baseline condition and for each arrested cylinder. As previously described, a default number of readings is taken for each set of fuel value readings. This may be 250 number of readings, or it may be more or less as desired. A first set of "n" readings (where "n" may be 250 or other selected number of readings) is taken from t0 to t1 in which all of the operational cylinders are running. The corresponding steady state value 112 may define a baseline condition. To verify this baseline condition, a second set of n readings is taken from $t_0$ to $t_1$. If the steady state value 114 is equivalent to the steady state value 112, then the arrest of the first cylinder may occur from time $t_2$ to $t_3$. During a period of time ($t_3$ to $t_4$) in which the first cylinder is completely arrested, the fuel requirement of the engine reaches what may be a new steady state value 116. To verify this steady state value 116, a second set of n readings is taken from time $t_4$ to $t_5$. If the steady state value 118 is not statistically different than the steady state value 116, then it is assumed that the engine is still operating at steady state operating conditions and the testing cycle moves on to the refueling of cylinder 1 and the arrest of cylinder 2. It is shown, by way of example only, that cylinder 2 includes a pair of n readings corresponding to steady state values 120 and 122 that both approximate and confirm steady state value 116. From time $t_7$ to $t_8$, it is shown that a first set of readings is taken with cylinder 3 arrested corresponding to a steady state value 124. The second set of readings, from time $t_8$ to $t_9$, corresponding to fuel value readings 126, however, do not approximate the first steady state value 124 for cylinder 3. In this example, a third set of readings 128, taken from time $t_9$ to $t_{10}$ is taken to confirm the existence of a new steady state operating condition for the engine. Thus, upon post examination of the fuel value readings for the testing cycle, it will be evident that some sort of macro transient occurred during the arrest of cylinder 3. Although not shown, it should be understood that all other functional cylinders in the testing cycle would have steady state values equivalent to steady state values 126 and 128, unless another disruption occurs in the testing cycle, and that any weak or non-functioning cylinders can be detected by a comparison of their steady state values to the steady state values of the functioning cylinders. Also, although not shown, the baseline condition that is returned to will probably not reflect the same baseline condition shown by steady state values 112 and 114, however, if the difference is properly accounted for during the course of the testing cycle, such as is done for cylinder 3, then the entire testing cycle need not be repeated, which can be a considerable time savings.

Figure 9:
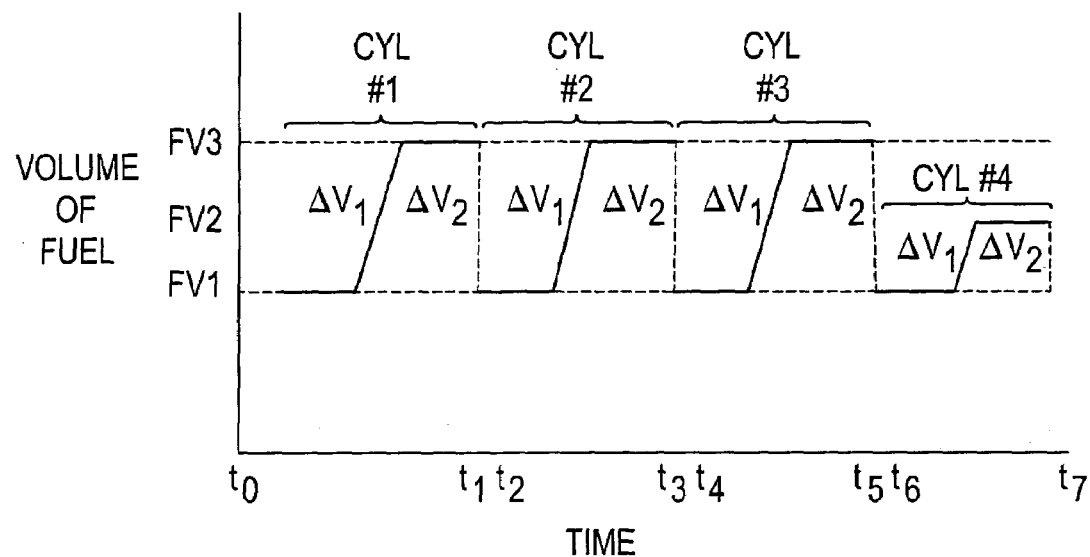
FIG. 9 is another graphical representation of a fuel requirement measurement to determine weak or non-functional cylinders in an engine.
Figure 10:
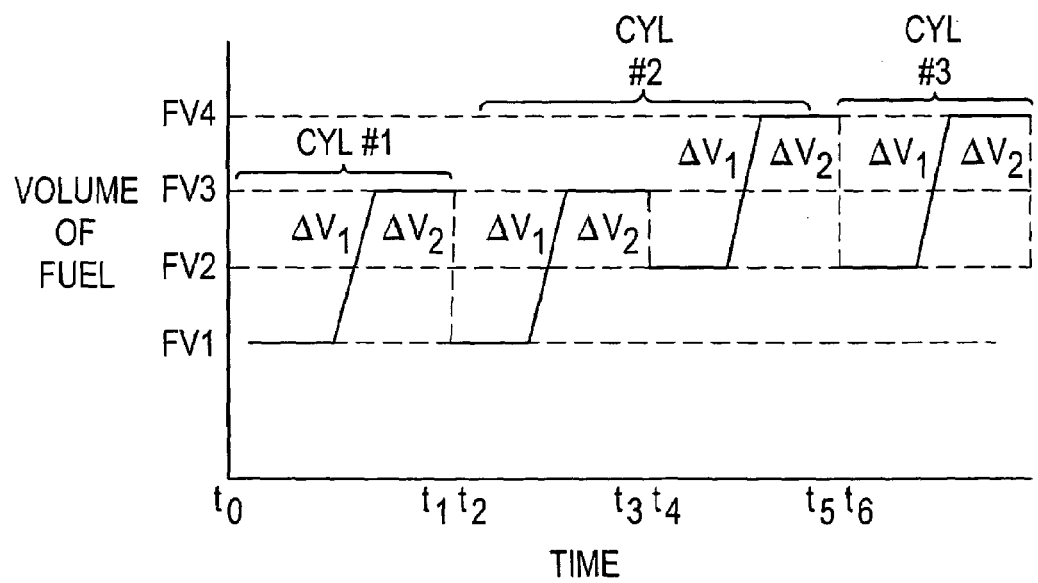
FIG. 10 is another graphical representation of a fuel requirement measurement to determine weak or non-functional cylinders in an engine.

FIGS. 9 and 10 show another embodiment where the time for the testing cycle can be even further reduced. As previously described, a typical number of readings may be 250 for a set of readings. In the embodiment of FIG. 8, in order to prevent the necessity of repeating an entire testing cycle, each baseline condition and each cylinder arrest may account for 500 (n times 2) readings. As shown in FIG. 9, no baseline condition is established. This alone accounts for a significant time savings. As the first cylinder is arrested, samples are collected throughout the arresting process, rather than waiting for the engine to arrive at a steady state condition. A reduced number, e.g. x, of samples (preferably less than 250, such as 100 or 156, for example only) may be taken during each arrest. Thus, samples are taken from time $t_0$ to $t_1$ and correspond to the arrest of cylinder 1. At time $t_1$, after a predetermined number of readings is taken, the first cylinder may be rendered operational again, from time $t_1$ to time $t_2$. To verify that the arrest of the first cylinder occurred at steady state, a comparison of fuel value readings is made. If delta V1=delta V2, then the second cylinder is arrested simultaneously with the first cylinder rendered operational. In this case, FV3−FV1=FV3−FV1. Similar to cylinder 1, cylinders 2 and 3 are shown to be functional as well as operating at steady state. In addition to cylinder 4 being shown as weak, it is also noted that the engine during the occurrence of the arrest of cylinder 4 may be verified to be operating at steady state by verifying that delta V1=delta V2, in this case FV2−FV1=FV2−FV1. Thus, the exemplary testing cycle shown in FIG. 9 is determined to be valid and the data collected may be analyzed for determining the existence of weak or non-functioning cylinders. The weakened state of cylinder 4 may be determined through a comparison of data, such as FV2−FV1 does not equal FV3−FV1.

Turning now to FIG. 10, similar to FIG. 9, samples are collected during the arrest of cylinders 1, 2, and 3. In this exemplary testing cycle, however, it may be determined that there is a disruption in the steady state conditions of the engine during the arrest of cylinder 2. From time $t_2$ to $t_3$, x number of fuel value readings are collected and delta V1=FV3−FV1. However, as the second cylinder is rendered operational again, from time $t_3$ to time $t_4$, it is determined that delta V2=FV3−FV2. Thus, delta V1 does not equal delta V2. Rather than arresting cylinder 3 at time $t_4$, cylinder 2 is again arrested and a set of x readings is taken from time $t_4$ to time $t_5$. From $t_4$ to $t_5$, it is determined that delta V1=delta V2 because FV4−FV2=FV4−FV2. Thus, through a comparison of the deltas, the validity of the test can be determined and immediately redone if necessary. In a later analyzation of the data, any set of samples in which delta V1 does not equal delta V2 may be appropriately accounted for as invalid data sets. Thus, FIGS. 9 and 10 describe a method in which a reduced number of samples may be taken, and in which the entire testing cycle need not be repeated, both factors providing a time savings, and inevitably a cost savings, for the testing method and system.

The following examples are illustrative only and should not be construed in a limiting sense. While the non-functioning cylinder detection algorithm was applied to the operation of two engines having a combined total of thirty fuel pumps in Example 1 and applied to a computer simulated operation of twenty four locomotive engines in Example 2, it should be understood that the non-functioning cylinder detection algorithm may be applied to any engine, stationary or vehicle mounted, in operation or analysis mode, and tested locally or remotely, as desired or deemed necessary by either an operator or the engine itself.

EXAMPLE 1

The non-functioning cylinder detection algorithm was applied to the operation of two engines having a combined total of thirty fuel pumps. Known data indicative of the operability of each pump was compared to the results of a process in which each pump was tested utilizing three trials of the non-functioning cylinder detection algorithm. As can be seen in the TABLE presented below, the three trials for each pump indicate a correlation with the known data for each pump. Pumps labeled "G" were determined to be "good," and pumps labeled "B" were determined to be "bad." The label of each pump given in the "Expert" column denotes whether that pump was actually good or bad. The label "Y" in the "Agree" column indicates that correlation existed between the results of each run and the actual operability or non-operability of the pump. Such a correlation indicates that operation of the dead cylinder detection algorithm has a repeatability and reproducibility ratio of 100%.

TABLE

Attribute Repeatability and Reproducibility

| Pump Tested | Expert | Run 1 | Run 2 | Run 3 | Agree |
|---|---|---|---|---|---|
| 1 | G | G | G | G | Y |
| 2 | B | B | B | B | Y |
| 3 | G | G | G | G | Y |
| 4 | G | G | G | G | Y |
| 5 | G | G | G | G | Y |
| 6 | B | B | B | B | Y |
| 7 | B | B | B | B | Y |
| 8 | G | G | G | G | Y |
| 9 | G | G | G | G | Y |
| 10 | G | G | G | G | Y |
| 11 | G | G | G | G | Y |
| 12 | B | B | B | B | Y |
| 13 | G | G | G | G | Y |
| 14 | G | G | G | G | Y |
| 15 | G | G | G | G | Y |
| 16 | G | G | G | G | Y |
| 17 | G | G | G | G | Y |
| 18 | B | B | B | B | Y |
| 19 | G | G | G | G | Y |
| 20 | G | G | G | G | Y |
| 21 | G | G | G | G | Y |
| 22 | B | B | B | B | Y |
| 23 | B | B | B | B | Y |
| 24 | G | G | G | G | Y |
| 25 | G | G | G | G | Y |
| 26 | G | G | G | G | Y |
| 27 | G | G | G | G | Y |
| 28 | B | B | B | B | Y |
| 29 | G | G | G | G | Y |
| 30 | G | G | G | G | Y |
| | | | | | 100% |

EXAMPLE 2

The non-functioning cylinder detection algorithm was applied to a computer simulated operation of twenty four locomotive engines to determine the risk of not detecting a non-functioning pump or causing a functioning pump to be removed from an engine. Of seven engines tested in the simulation, 65 pumps were simulated as being non-functional, and the non-functioning cylinder detection algorithm correctly identified all 65 non-functioning pumps to produce a risk of not detecting a non-functioning pump of zero percent. Of 24 engines tested in a simulation, 498 pumps were simulated as being functional and two pumps were simulated as being non-functional. The dead cylinder detection algorithm correctly identified the two non-functioning pumps and additionally mis-identified three additional pumps as being non-functional. The total risk of mis-identifying a pump as non-functioning is 0.4%.

Thus, a method and system has been described which is usable in both vehicles, such as railway locomotives or marine vehicles, and in stationary equipment, such as stationary power generators. In the case of vehicles, the vehicles may be tested in either moving conditions (in transit) or stationary conditions. Also, for either vehicles or stationary equipment, testing may be run while the engine is either in an operating state or in an analysis mode. Furthermore, in any case, testing may be accomplished locally or remotely.

While the above-described system for the detection of substandard conditions present in the various components of an internal combustion engine has been described with reference to a preferred embodiment thereof, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the invention, but that the invention will include all embodiments falling within the scope of the disclosure. Terms used herein such as first, second, etc. are not intended to imply an order in space or importance, but are merely intended to distinguish between two elements.

What is claimed is:

1. A method of analyzing the operation of a fuel injected, multi-cylinder engine, wherein said engine is supported on a motor vehicle, wherein the method is performed when said motor vehicle is in operational travel, the method comprising:

operating the engine in an analysis mode at a substantially constant operating condition;

gathering data of a parameter indicative of engine cylinder performance when the engine is operating on a subset of all cylinders in said analysis mode;

gathering data of the parameter indicative of engine cylinder performance when the engine is operating with the operation of at least one cylinder arrested in said analysis mode until data gathering has been performed with a subset of all cylinders having been arrested; and analyzing said gathered data to identify the effect on engine operations due to the arrest of cylinder operation and to identify cylinders delivering substandard performance.

2. The method of claim 1 wherein the operating at a substantially constant operating condition comprises operating the engine at a steady-state operating speed.

3. The method of claim 1 wherein the operating at a substantially constant operating condition comprises operating the engine at a steady-state temperature.

4. The method of claim 1 wherein the operating at a substantially constant operation condition comprises operating the engine at a steady-state engine load.

5. The method of claim 1 wherein the gathering of data of a parameter indicative of engine cylinder performance comprises gathering data indicative of power generation at the engine cylinder.

6. The method of claim 5 wherein the gathering data of a parameter indicative of power generation at the engine cylinder comprises gathering data indicative of fuel usage in the engine cylinders that have not been shutoff.

7. The method of claim 5 wherein the gathering data of a parameter indicative of power generation at the engine cylinder comprises measuring times during which fuel is delivered to a respective cylinder.

8. The method of claim 5 wherein the gathering data of a parameter indicative of power generation at the engine cylinder comprises measuring amounts of fuel delivered to a respective cylinder.

9. The method of claim 1 wherein the operation of only one cylinder at a time is arrested.

10. The method of claim 1 wherein the operation of an inquiry set of at least two cylinders at a time is arrested.

11. The method of claim 1 further comprising analyzing said gathered data at a site adjacent the engine.

12. The method of claim 1 further comprising transmitting said data to a remote location and analyzing said data at said remote location.

13. The method of claim 1 comprising displaying information representative of the results of the analysis of said data at a display.

14. The method of claim 1 further comprising performing the method while the engine is in normal operation.

15. A method of analyzing the operation of a fuel injected, multi-cylinder engine, wherein said engine is supported on a motor vehicle, wherein the method is performed when said motor vehicle is in operational travel, the method comprising:
(a) gathering a first set of data of a parameter indicative of engine cylinder performance when the engine is operating on a first subset of all cylinders;
(b) gathering a second set of data of the parameter indicative of engine cylinder performance when the engine is operating on the first subset of all cylinders;
(c) comparing the first set of data to the second set of data, and, if not equivalent, obtaining a third set of data, comparing the third set of data to the second set of data, and so on until an n+1 set of data is equivalent to an n set of data;
(d) gathering and comparing first and second sets of data of the parameter indicative of engine cylinder performance when the engine is operating with the operation of at least one cylinder arrested, and, if not equivalent, gathering a third set of data of the parameter indicative engine cylinder performance when the engine is operating with the operation of at least one cylinder arrested and comparing to the second set of data of the parameter indicative of engine cylinder performance when the engine is operating with the operation of at least one cylinder arrested, and so on until an n+1 set of data is equivalent to an n set of data;
(e) repeating step (d) until a subset of all cylinders have been arrested; and,
(f) analyzing the gathered data to identify effect on engine operations due to the arrest of cylinder operation and to identify cylinders delivering substandard performance.

16. The method of claim 15 wherein the gathering of first and second sets of data of the parameter indicative of engine cylinder performance gathering data indicative of power generation at the engine cylinder.

17. The method of claim 15 wherein analyzing the gathered data to identify any effect on engine operations due to the arrest of cylinder operation and to identify cylinders delivering substandard performance comprises analyzing said gathered data to identify cylinders generating a substandard level of power output.

18. The method of claim 17 wherein the identifying of cylinders delivering substandard performance comprises identifying cylinders producing less than the standard level of power.

19. The method of claim 17 wherein the identifying of cylinders delivering substandard performance comprises identifying cylinders producing more than the standard level of power.

20. A computer having software for analyzing operation of a fuel injected, multi-cylinder engine, the computer implementing a method comprising:
gathering data indicative of engine cylinder performance when the engine is operating on a subset of all cylinders in an analysis mode, wherein the engine is operated in the analysis mode at a substantially constant operating condition;
gathering data of the parameter indicative of engine cylinder performance when the engine is operating with the operation of at least one cylinder arrested in the analysis mode until data gathering has been performed with a subset of all cylinders having been arrested; and
analyzing said gathered data to identify effect on engine operations due to the arrest of cylinder operation and to identify cylinders delivering substandard performance.

21. A computer having software for analyzing operation of a fuel injected, multi-cylinder engine, the computer implementing a method comprising:
(a) gathering a first set of data of a parameter indicative of engine cylinder performance when the engine is operating on a first subset of all cylinders;
(b) gathering a second set of data of the parameter indicative of engine cylinder performance when the engine is operating on the first subset of all cylinders;
(c) comparing the first set of data to the second set of data, and, if not equivalent, obtaining a third set of data, comparing the third set of data to the second set of data, and so on until an n+1 set of data is equivalent to an n set of data;
(d) gathering and comparing first and second sets of data of the parameter indicative of engine cylinder performance when the engine is operating with the operation of at least one cylinder arrested, and, if not equivalent, gathering a third set of data of the parameter indicative engine cylinder performance when the engine is operating with the operation of at least one cylinder arrested and comparing to the second set of data of the parameter indicative of engine cylinder performance when the engine is operating with the operation of at least one cylinder arrested, and so on until an n+1 set of data is equivalent to an n set of data;
(e) repeating step (d) until a subset of all cylinders have been arrested; and,
(f) analyzing the gathered data to identify effect on engine operations due to the arrest of cylinder operation and to identify cylinders delivering substandard performance.

22. A method of analyzing operation of a fuel-injected, multi-cylinder engine, wherein said engine is supported on a motor vehicle, the method comprising:
measuring a parameter related to engine output while the motor vehicle is in operational travel;
gathering data indicative of the parameter; and,
analyzing the gathered data to identify any cylinder delivering substandard performance.

23. The method of claim 22 further comprising operating the engine to attain a steady-state operating condition, the steady-state operating condition comprising at least one of a steady-state operating speed, a steady state operating temperature, and a steady-state engine load.

24. The method of claim 22 further comprising transmitting said data to a remote location and analyzing said data at said remote location.

25. The method of claim 22 wherein analyzing the gathered data to identify any cylinder delivering substandard performance comprises analyzing the gathered data to identify any cylinder generating a substandard level of power output.

26. A computer having software for analyzing operation of a fuel injected, multi-cylinder engine, wherein said engine is supported on a motor vehicle, the computer implementing a method comprising:
measuring a parameter related to engine output while the motor vehicle is in operational travel;
gathering data indicative of the parameter; and,
analyzing the gathered data to identify any cylinder delivering substandard performance.

27. A method of analyzing operation of a fuel-injected, multi-cylinder engine, wherein said engine is supported on a motor vehicle, the method utilizing a system for detecting conditions indicative of substandard performance of the engine while the engine is operating at a steady state and at operational temperature and while the vehicle is traveling for at least one of a set load or a set speed, the system including an engine control unit disposed in operable communication with the engine to control the engine while the vehicle is traveling, and a computer disposed in informational communication with said engine control unit, the computer having the ability to communicate with the engine control unit while the vehicle is traveling, the method comprising:

measuring a parameter related to engine output while the vehicle is in operational travel.

28. The method of claim 27 further comprising gathering data indicative of the parameter, and analyzing the gathered data to identify cylinders delivering substandard performance.

* * * * *

UNITED STATES PATENT AND TRADEMARK OFFICE
CERTIFICATE OF CORRECTION

PATENT NO. : 6,996,467 B2 Page 1 of 1
APPLICATION NO. : 11/098335
DATED : February 7, 2006
INVENTOR(S) : Daniel et al.

It is certified that error appears in the above-identified patent and that said Letters Patent is hereby corrected as shown below:

Column 1,
Line 13, delete second occurrence of "of".

Column 10,
Line 66, after "of" (first occurrence) delete "the".

Column 12,
Line 15, after "time" delete "t0 to t1" and insert -- $t_0$ to $t_1$ --.
Line 19, after "time" delete "t1 to t2" and insert -- $t_1$ to $t_2$ --.
Line 21, after "time" delete "t2 to t3" and insert -- $t_2$ to $t_3$ --.
Line 23, after "time" delete "t3" and insert -- $t_3$ --.
Line 31, after "at" delete "tend" and insert -- $t_{end}$ --.
Line 33, after "time" delete "t5" and insert -- $t_5$ --.
Line 34, before ")." delete "t6" and insert -- $t_6$ --.

Column 13,
Line 3, after "from" delete "t0 to t1" and insert -- $t_0$ to $t_1$ --.
Line 57, after "or" delete "156" and insert -- 150 --.

Signed and Sealed this

Twentieth Day of June, 2006

JON W. DUDAS
*Director of the United States Patent and Trademark Office*